Oct. 19, 1965    J. L. GREENWELL    3,212,663
HERMETIC CLOSURE FOR CONTAINERS
Filed Aug. 14, 1964

INVENTOR.
JOSEPH L. GREENWELL
BY
*Lloyd J. Sanders*

3,212,663
HERMETIC CLOSURE FOR CONTAINERS
Joseph L. Greenwell, 8320 SW. 151st St., Miami, Fla.
Filed Aug. 14, 1964, Ser. No. 389,650
2 Claims. (Cl. 215—31)

This invention relates in general to closures for containers and more particularly a sealing means between a metal cap and a plastic container.

Prior metal caps of the threaded variety employ a resilient gasket between the planar top surface of the neck of the container and the inside planar surface of the cap for the purpose of forming a hermetic closure when the cap is threaded and tightened on the neck of the container.

This type of container is fraught with leakage difficulty largely due to inadequate pressure applied to the gasket and frequently due to a slightly non-planar condition on the top of the neck due to a slight misalignment of the halves of the mold used in forming the container. This fault is particularly aggravating in blow molded containers because of the relatively thin and flexible lip on the neck of the container, which is subject to low pressure deformation.

The present invention overcomes the above objections and disadvantages by the provision of a narrow circumferential projection extending from the sealing lip of the container and is a principal object of the invention.

A further object of the invention is the provision of a threaded neck for a blow molded container having a projection of uniform cross section extending from the sealing lip thereof and integral U-shaped reinforcement in the junction of the neck and the container for rigidizing the latter.

These and other objects and advantages, in one embodiment of the invention are described and shown in the following specification and drawing, in which.

Figure 2:
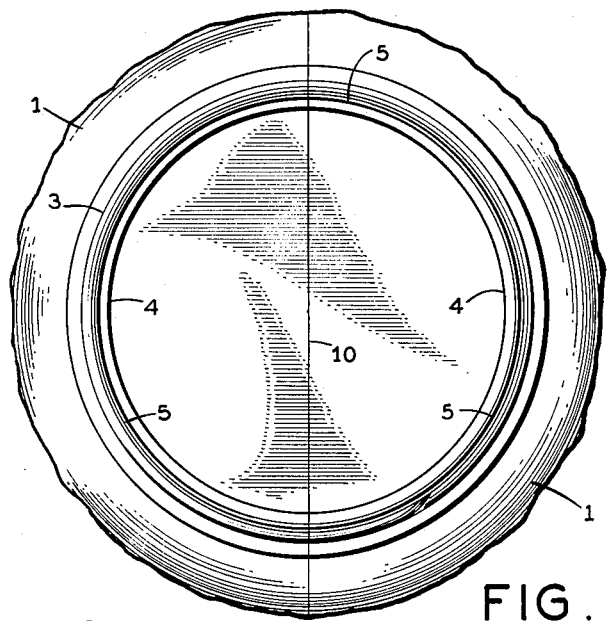
FIG. 2 is an enlarged plan view of the neck of the container, shown in FIG. 1.
Figure 3:
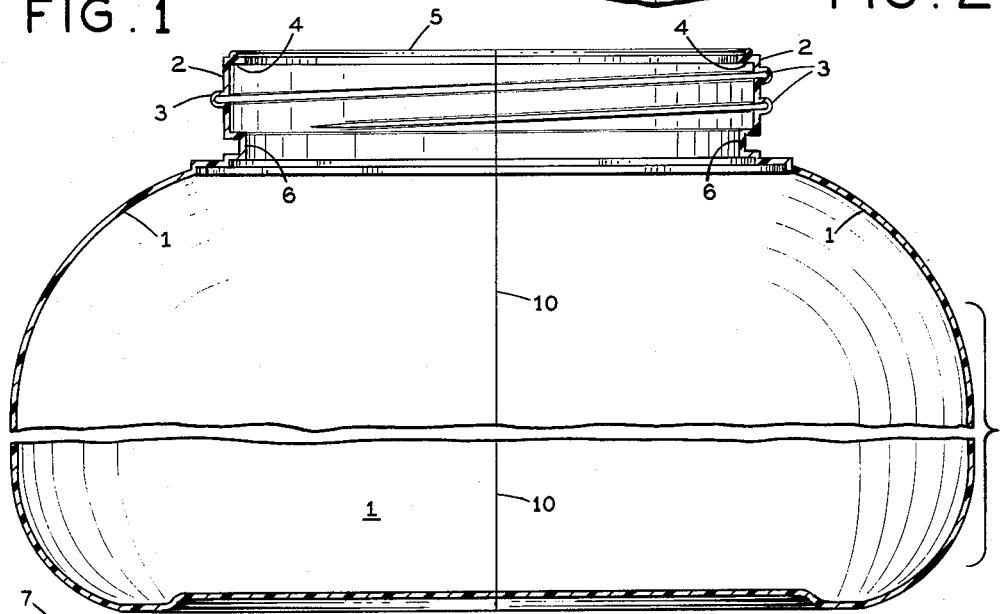
FIG. 3 is an enlarged fragmentary cross sectional elevation taken through section line 3—3, FIG. 1.

Referring to the figures, a typical container 1 is provided with a cylindrical neck 2 with an integral coarse thread 3 molded on the outer periphery thereof. The upper edge 4 of the neck extends inward, as shown in FIGS. 2 and 3, and a circular projection 5 having a radius on its upper edge is integral with and extends normal to the upper surface of the lip 4.

The projections 5 are positioned in relatively close proximity to the outer periphery of the neck 2.

Since plastic containers are inherently flexible and transverse rigidity thereof is highly desirable, a blow molded container cannot include heavier cross sections for reinforcement because of the inherent substantially uniform thickness of the material. A U-shaped integral junction 6 is provided between the neck 2 and the body 1 of the container, as shown, which junction greatly reinforces the transverse rigidity of the neck portion of the container.

Figure 1:
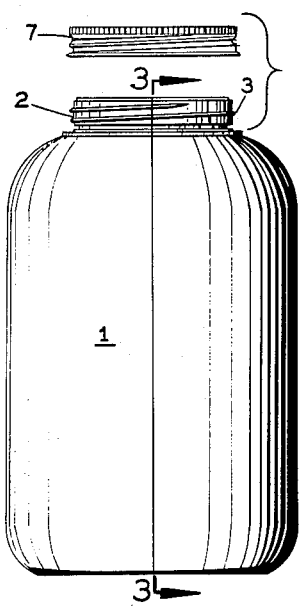
FIG. 1 is an elevation of a typical container for a screw type cover with a cover displaced therefrom.
Figure 4:
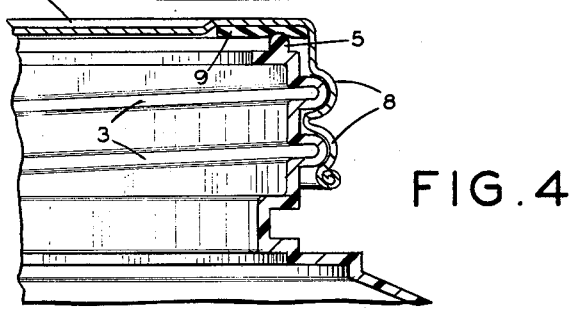
FIG. 4 is an enlarged fragmentary cross sectional elevation of a portion of the container showing the cover thereof in sealed position.

The formed metal cover 7, shown in FIGS. 1 and 4, has an internal thread 8 formed therein for mating engagement with the external thread 3 and includes a resilient circular gasket 9 secured to the inner planar surface of the cover, as shown.

The line 10 in FIGS. 1, 2, and 3, represents the plane of deformation in the container caused by the imperfect junction of the two halves of the mold when the container is molded.

It is to be noted that since the expansion and contraction of the neck of the container is greater than that of a conventional metal cover, that under tight threading conditions the U-shaped reinforcement 6 is important in preventing deformation of the neck and resulting leakage when the cover is applied when the container is subjected to temperatures higher than normal.

In operation, when the cover 7 is threaded on the neck, as shown in FIG. 4, the projection 5 will embed into gasket 8 a sufficient distance to form a high pressure hermetic seal following a moderate torque applied to the cover, since the unit pressure on the relatively small area of the projection is several times higher than that if the same sealing torque was applied to the full area of the lip 4. Reasonable dimensional changes due to temperature will not result in leakage.

It is further important to notice that even if the junction of the material at line 10 formed by the two halves of the mold is slightly misplaced, this deviation in the junction of the two halves of the container at the projection 5 will be compensated and sealed by its embedment in the gasket 8.

Certain modifications in the above construction, utilizing the features described, are intended to come within the scope of the appended claims.

Having described my invention, I claim:

1. A plastic container made by the blow mold process with a mold having two halves parted along a central vertical cross section with said halves subject to small misalignment when used comprising a hollow container means of substantially unifrom thickness having a cylindrical neck portion forming the opening therein and terminating in an inward extending flange substantially normal to the axis of said neck for reinforcing the latter against non-circular flexure, said container means and said neck having a linear misaligned parting deformation therein corresponding to the misalignment of the junction of said two halves of said mold, a circular sealing projection integral with and extending substantially normal from said flange and coaxial therewith including said deformation at opposite sides thereof, a cover for said container having internal threads mated with said external threads on said neck and including a resilient gasket retained therein for compressive engagement by said projection when said cover is threaded on said neck and providing a hermetic seal for said container with sealing compensation at said parting deformation.

2. The construction recited in claim 1 including a U-shaped wall forming an integral junction between said container and said neck for reinforcing the latter against non-circular flexibility.

References Cited by the Examiner
UNITED STATES PATENTS 3,122,256  3/59  Orr _____ 215—31
3,129,528  8/62  Gausewitz _____ 215—31

JOSEPH R. LECLAIR, *Primary Examiner.*